United States Patent [19]

Hatada et al.

[11] Patent Number: 4,571,672
[45] Date of Patent: Feb. 18, 1986

[54] ACCESS CONTROL METHOD FOR MULTIPROCESSOR SYSTEMS

[75] Inventors: Minoru Hatada, Ebina; Hideaki Ishida; Masatoshi Matsushita, both of Kawasaki, all of Japan

[73] Assignees: Hitachi, Ltd.; Hitachi Micro Computer Engineering Ltd., both of Tokyo, Japan

[21] Appl. No.: 563,038

[22] Filed: Dec. 19, 1983

[30] Foreign Application Priority Data

Dec. 17, 1982 [JP] Japan ................................. 221684

[51] Int. Cl.⁴ .......................................... G06F 15/16
[52] U.S. Cl. .................................................. 364/200
[58] Field of Search ...................... 364/200 MS File

[56] References Cited

U.S. PATENT DOCUMENTS

4,449,181  5/1984  Young et al. ...................... 364/200

Primary Examiner—Raulfe B. Zache
Attorney, Agent, or Firm—Antonelli, Terry & Wands

[57] ABSTRACT

In a multiprocessor system, a data transferring port into which data can be written only when no data is stored and from which data can be read only when it is stored is provided, and the port itself is caused to perform an exclusion control, whereby that processor of a plurality of processors which has once acquired a bus mastership is prevented from making another bus use request until the bus use requests of the other processors run out.

2 Claims, 15 Drawing Figures

ACCESS CONTROL METHOD FOR MULTIPROCESSOR SYSTEMS

BACKGROUND OF THE INVENTION

1. Field of the Invention

The present invention relates to an access control method for multiprocessor systems, and more particularly to a method of controlling access to a bus or a memory, which dispenses with an exclusion control for the shared or common memory or the common bus and which can equalize the masterships of respective processors.

2. Description of the Prior Art

Heretofore, in a multiprocessor system including a plurality of processors, an error developing in the communication between the processors has posed problems. Moreover, since an exclusion control is performed in using a commom memory or a common bus, the bus becomes unusable for a long time, with the result that the inequality of masterships has arisen among the processors.

Figure 1:
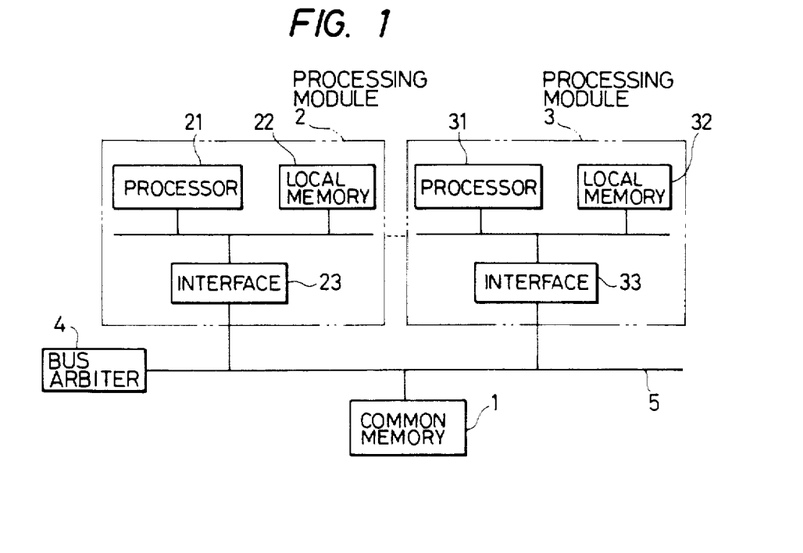
FIG. 1 is a block diagram of a prior-art multiprocessor system having a common memory.

FIG. 1 is a block diagram of a prior-art multiprocessor system with a common memory.

In the multiprocessor system having the common memory, a plurality of processing modules (PM) 2, 3 which consist of processors 21, 31, local memories 22, 32 and interfaces 23, 33; the common memory (CM) 1; and a bus arbiter (BA) 4 are connected through a common bus 5. The respective processors 21, 31 can access the common memory 1 in quite the same manner that they access the local memories 22, 32.

Figure 2:
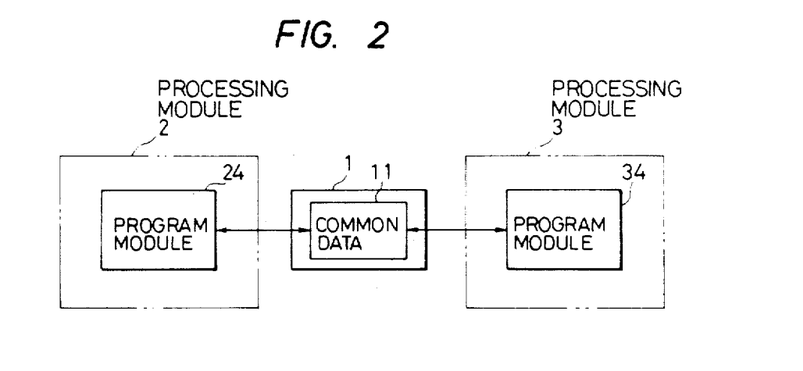
FIG. 2 is a diagram showing a method for the communication between program modules in the system of FIG. 1.

FIG. 2 is a diagram showing a method for that communication between program modules which is executed in the system of FIG. 1. The program modules 24, 34 are stored in the local memories 22, 32 within the different processing modules 2, 3, and they are executed by the corresponding processors 21, 31. The communication between the program modules 24, 34 is performed through common data (CD) 11 which is stored in the common memory 1. Since the common data 11 is freely accessed from either desired program module at any desired time, the versatility of the communication between the processors is very high. On the other hand, however, when a bug exists in a program, it is difficult to detect the corresponding part so as to correct the bug.

The common memory 1 cannot be simultaneously accessed by two or more processors. The bus arbiter 4 performs an exclusion control for the common bus 5 so as to prevent the simultaneous access to the common memory by the plurality of processors. In addition, the processor 21 or 31 has the exclusion control function of excluding the opposite processor and completely occupying the common bus 5 while the common data 11 is accessed and updated. It is true that such exclusion control is indispensable to any common memory connection method. With the prior-art method, however, a common bus occupation time required for the exclusion control is too long. Therefore, when the number of the processors is large, the common bus inoccupation-waiting time of each processor becomes very large. This results in the disadvantage of incurring increase in the overhead of the whole system.

Figure 3:
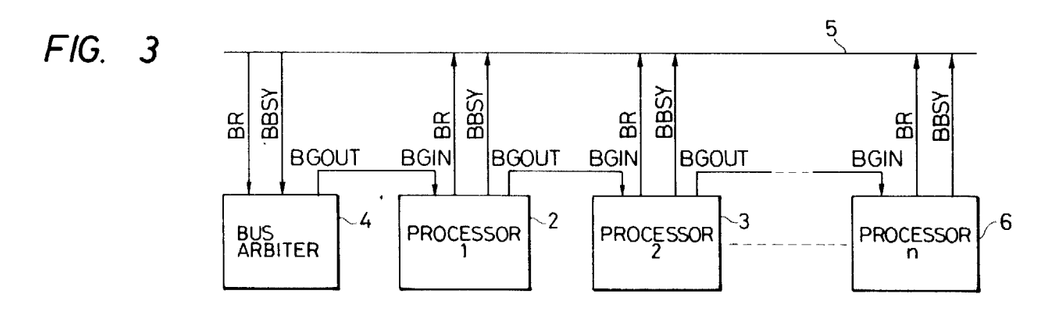
FIG. 3 is a diagram showing a bus control method for a prior-art multiprocessor system.

FIG. 3 is a diagram showing a bus control method in a prior-art multiprocessor system.

In the multiprocessor system wherein a plurality of processors 2, 3, . . . 6 are connected to an identical bus 5, the control is performed by the daisy chain method as illustrated in FIG. 3.

Now, when one of the processors 2, 3, . . . 6 has provided a request signal BR for the use of the bus, a bus arbiter 4 discriminates whether or not the bus is in the usable status, and it delivers a bus use grant signal BGOUT subject to the usable status. The bus use grant signal BGOUT is transmitted by the daisy chain in succession from the processor 2 which is physically closest to the bus arbiter 4, and it is received by the processor which has provided the bus use request signal BR. When, after one processor has acquired the bus mastership. the bus use request signal BR is provided from another processor, a bus busy signal BBSY is delivered from the occupying processor. The bus arbiter 4 receives these signals BR and BBSY, thereby to grasp the situation of the use of the bus.

Figure 4:
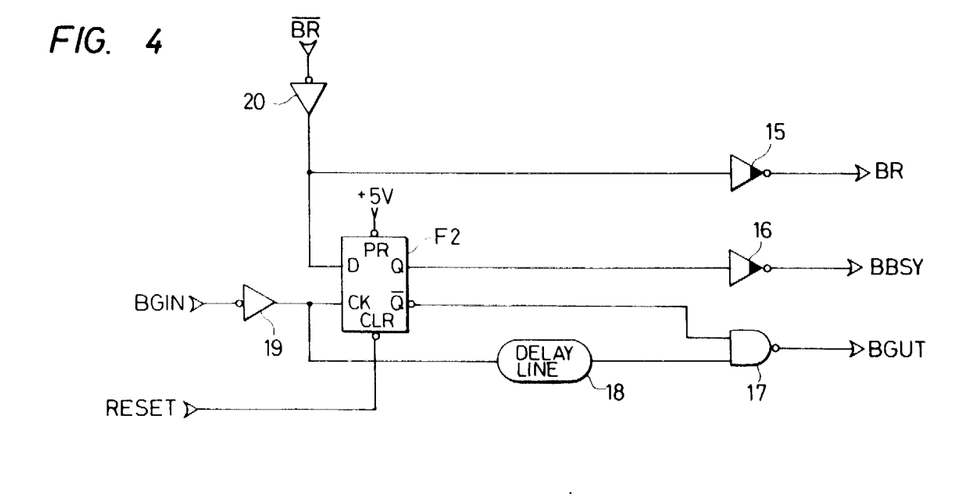
FIG. 4 is a logical structure diagram of a bus control circuit for each processor in FIG. 3.

FIG. 4 is a logical structure diagram of a bus control circuit for the processor in FIG. 3.

When the processor has issued a bus use request $\overline{BR}$, a bus driver 15 is actuated to deliver the request signal BR. Also a flip-flop F2 is set in synchronism with the reception of a use grant signal BGIN, and a bus driver 16 is actuated by the resulting set output so as to deliver the bus busy signal BBSY. The bus use grant signal BGIN is delivered to the succeeding processor through an inverter 19, a delay line 18 and a NAND circuit 17. More specifically, after the flip-flop F2 has been reset by the inversion of the bus use request $\overline{BR}$, occurring when the processor has stopped using the bus, or by a reset signal RESET, the NAND circuit 17 is enabled by the resulting reset output, whereby the use grant signal BGOUT is delivered to the adjoining processor.

Thus, each processor can freely provide the bus use request signal BR. Therefore, the processor physically closer to the bus arbiter 4 has a higher priority level for acquiring the mastership of the bus. In consequence, the processor located in a place physically remoter from the bus arbiter 4 has the bus use grant signal BGOUT blocked by the closer processor and cannot acquire the mastership. Accordingly, the bus masterships become very unequal.

SUMMARY OF THE INVENTION

The present invention has been made in order to improve the disadvantages of the prior arts, and has for its object to provide an access control method for multiprocessor systems which can quickly detect and correct the bug of a program, which can shorten a common bus occupation time required for an exclusion control and which can equalize the bus masterships of respective processors.

To the accomplishment of the object, the access control method for a multiprocessor system according to the present invention is characterized in that a data transferring port into which data can be written only when it is unoccupied and from whch data can be read only when it has the data is provided to prevent errors which are ascribable to writing double and reading the same data twice, and to cause the port itself to perform an exclusion control operation. Further, the present invention is characterized in that when a plurality of processors have simultaneously made requests for the use of a bus, one of the processors is endowed with a bus mastership, but the processor having already acquired the mastership is prevented from making the bus use request again until the use requests of the other processors run out.

DETAILED DESCRIPTION OF THE PREFERRED EMBODIMENTS

Figure 5:
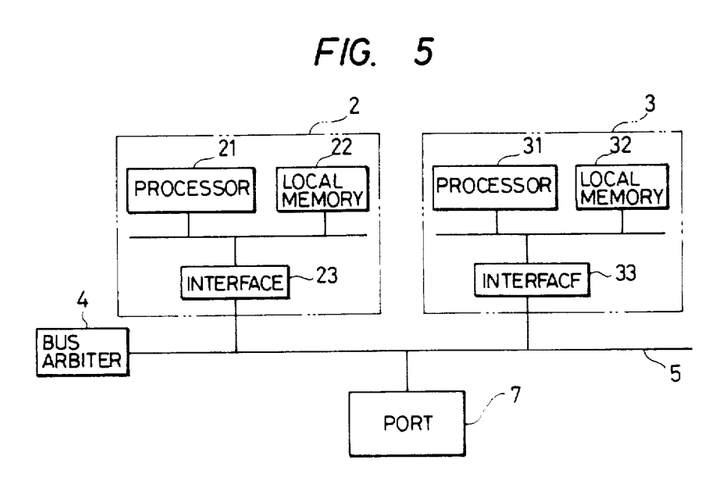
FIG. 5 is a conceptual diagram of data-flow processors illustrative of an embodiment of the present invention.

FIG. 5 is a conceptual diagram of data-flow processors showing an embodiment of the present invention.

Referring to FIG. 5, a port (PO) 7 is just like a box which can functionally store only one data. Only when the port 7 is unoccupied, data can be written thereinto. In addition, only when one data is stored, it can be read out, whereupon the port 7 becomes unoccupied. When it is intended to read data in the unoccupied status of the port 7 or to write data in the fully occupied status in which one data is stored, the access ends in failure.

Figure 6:
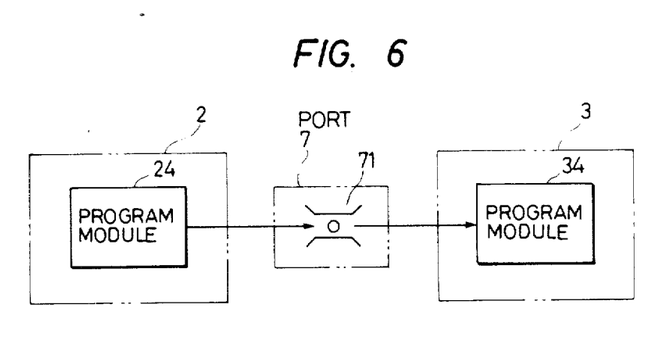
FIG. 6 is a diagram showing a method for the communication between the processors in FIG. 5.

FIG. 6 is a diagram showing a method for the communication between the processors in FIG. 5.

Program modules 24 and 34 transmit and receive common data 71 through the port 7. The communication in this system corresponds to transferring messages. Owing to the invention of the port 7, data once written can be prevented from being erroneously rewritten, and an erroneous read or write operation can be quickly detected and corrected. That is, when an operation of writing or reading data has ended in failure, it can be detected as being the erroneous write or read.

With the data-flow connection method, the port 7 itself has the exclusion control function, and hence, the exclusion control as required in the conventional common memory connection method is dispensed with.

Figure 7A:
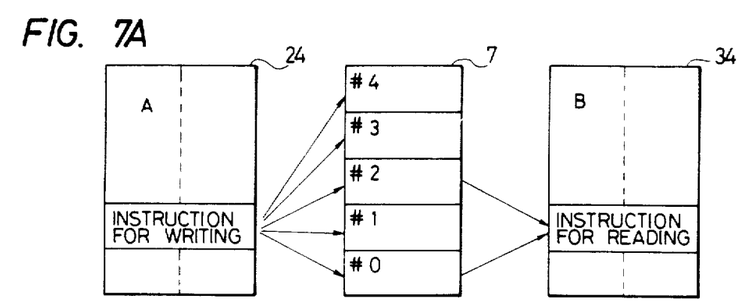
FIG. 7(a) and 7(b) are explanatory diagrams of pipeline processing which is performed in accordance with FIG. 6.
Figure 7B:
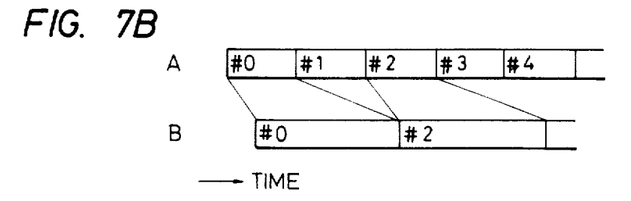

FIGS. 7(a) and 7(b) are diagrams for explaining a case where pipeline processing is performed according to FIG. 6. FIG. 7(a) elucidates the operation, while FIG. 7(b) shows a time chart.

The program modules 24 and 34 are capable of the pipeline processing by the use of the port 7. In a case where the program module (A) 24 includes instructions for writing data into five ports #0–#4 in the order mentioned and where the module (B) 34 includes instructions for reading the data from the two ports #0 and #2 of the five ports, the module (B) 34 need not wait until the write instructions of the module (A) 24 end completely, but it can immediately execute the read instructions when the data of the ports #0 and #2 have been written. That is, as illustrated in FIG. 7(b), after the data writing instruction of the port #2 has been started, the data read of the port #2 is started.

Figure 8:
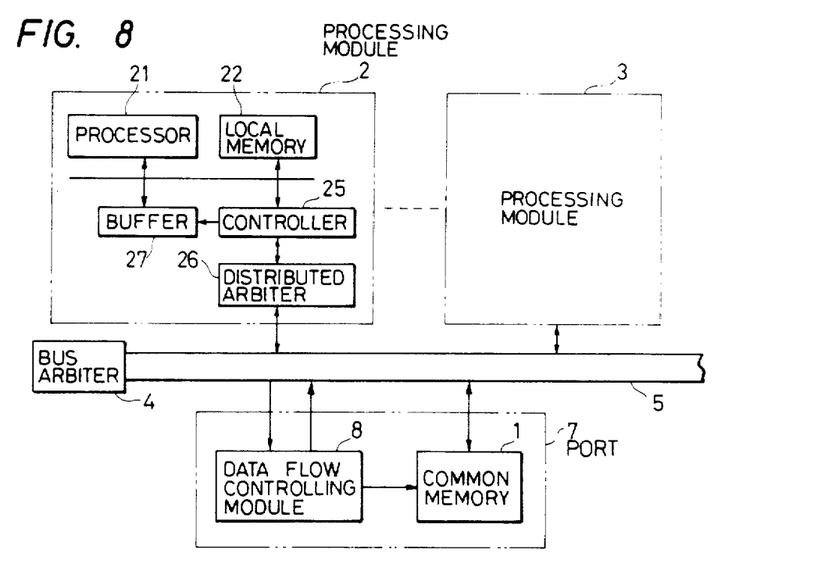
FIG. 8 is a block diagram of the whole system of data-flow processors illustrative of an embodiment of the present invention.

FIG. 8 is a setup diagram of the whole system of the data-flow processors showing an embodiment of the present invention.

A plurality of processing modules 2 each of which consists of a processor 21, a local memory 22, a buffer 27, a controller 25 and a distributed arbiter 26; a bus arbiter 4; and a port 7 which consists of a common memory 1 and a data flow controlling module 8 are connected through a common bus 5.

The respective processors can write data into the common memory 1 of the port 7 or read data therefrom. At that time, the data flow controlling module 8 manages the operation so that data once written may not be erroneously rewritten and that an erroneous read or write operation may be quickly detected. In each processing module 2, the buffer 27, controller 25 and distributed arbiter 26 are arranged instead of the foregoing interface 23, so as to perform a more delicate control owing to functions distributed thereto.

There will now be explained the data flow controlling module 8 which forms the central figure of the present invention.

Figure 9:
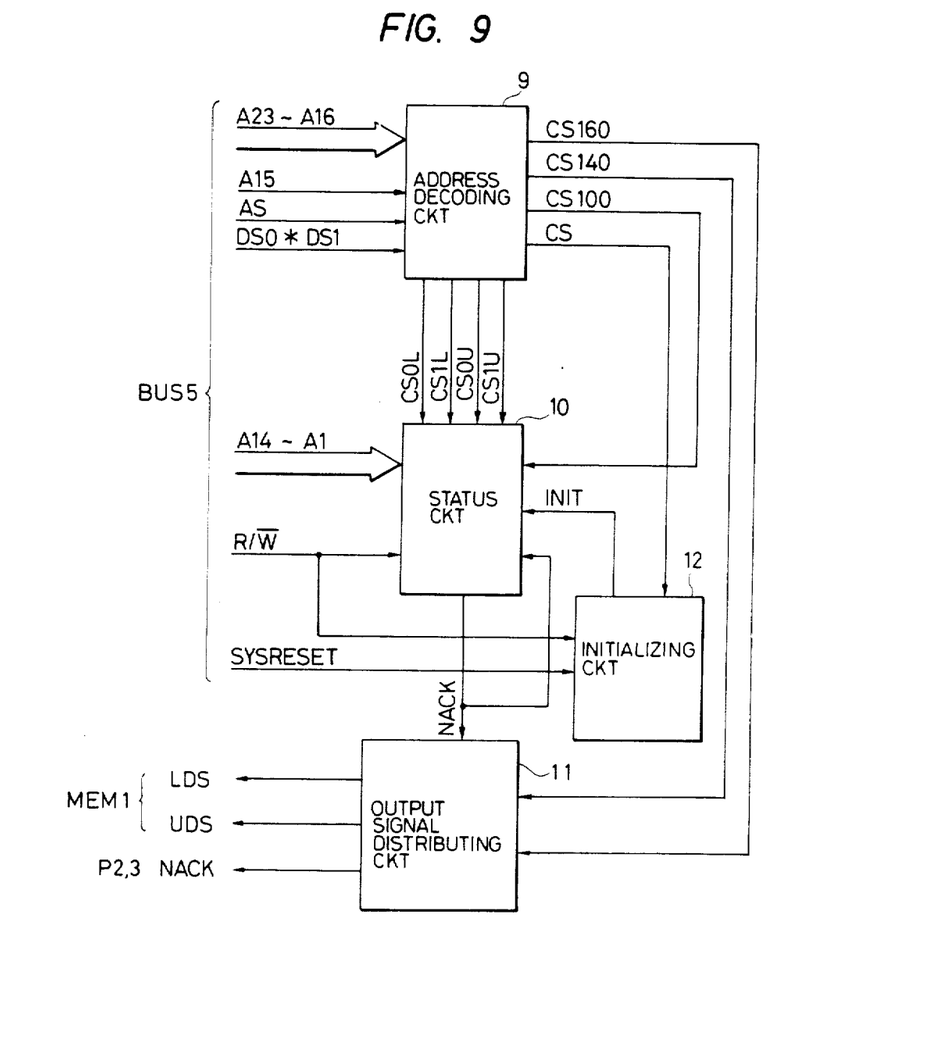
FIG. 9 is a block diagram of a data-flow control module in FIG. 8.

FIG. 9 is a block diagram of the data flow controlling module in FIG. 8.

This module 8 has one bit of status information every byte of the common memory 1. The status information indicates whether the port 7 is in the unoccupied status ("0") or in the fully occupied status ("1"). When the write operation in the unoccupied status or the read operation in the fully occupied status is performed, the status information is inverted, and a data strobe signal LDS, UDS is delivered from this module 8 to the common memory (MEM) 1, depending upon a data strobe signal DS0, DS1 on the common bus (BUS) 5. Thus, the data itself of the common memory (MEM) 1 is actually accessed. In the read operation in the unoccupied status of the port 7 or the write operation in the fully occupied status, the signal LDS, UDS is not provided, and the access of the data itself is not performed. Instead, a signal NACK, which indicates that the access has ended in failure, is delivered to the processing module which has intended the access. In this case, the status information does not change.

As shown in FIG. 9, the data flow controlling module 8 is constructed of an address decoding circuit 9, a status circuit 10, an output signal distributing circuit 11 and an initializing circuit 12. Next, these circuits will be described.

Figure 10:
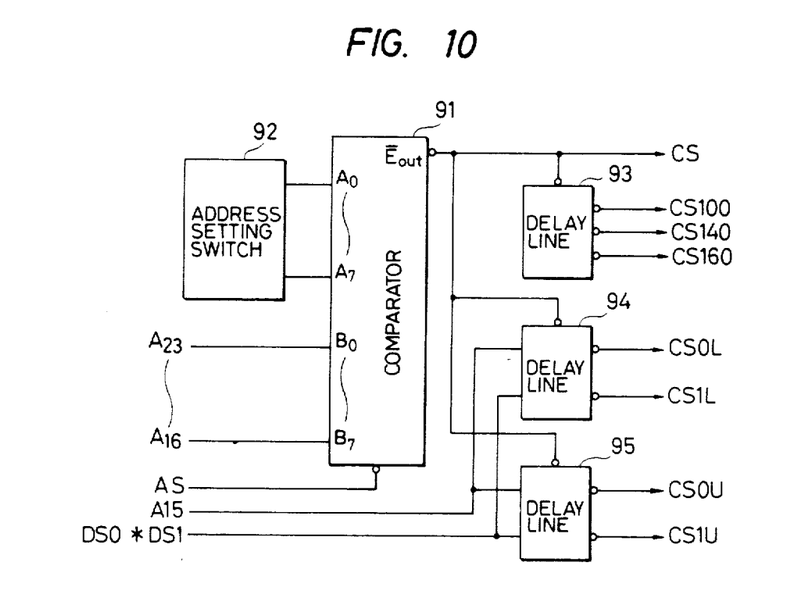
FIG. 10 is a block diagram of an address decoding circuit in FIG. 9.

FIG. 10 is a block circuit of the address decoding circuit in FIG. 9.

This circuit generates a signal CS which indicates that an address area supported by the data flow controlling module 8 has been accesseed; signals CS100, CS140 and CS160 which are respectively delayed by fixed times; and signals CS0L, CS1L, CS0U and CS1U which select memories in the status circuit 10 for storing the status information. By way of example, when RAMs each being of 16 k × 1 bits are used as the status memories, 64 k ports can be supported as a whole, that is, 64 kilobytes of areas can be supported on the common memory 1.

In FIG. 10, a comparator circuit 91 compares the address A0–A7 of the common memory 1 and an accessed address A16–A23 (B0–B7). When they have agreed, it supplies the common memory 1 with the chip select signal CS and also supplies the status circuit 10 with the signal CS0l, CS1L, CS0U or CS1U. The addresses of the common memory 1 can be determined at will with an address setting switch 92. For example, in a case where, among addresses 0–10000, a range of addresses 2000–3000 is desired to be used as the objects of the ports, the addresses A0–A7 are set at this range by the address setting switch 92. The memory addresses to be accessed are divided into upper addresses A0–A15 and lower addresses A16–A23, and only the lower addresses A16–A23 are compared and checked in the address decoding circuit 9.

Figure 11:
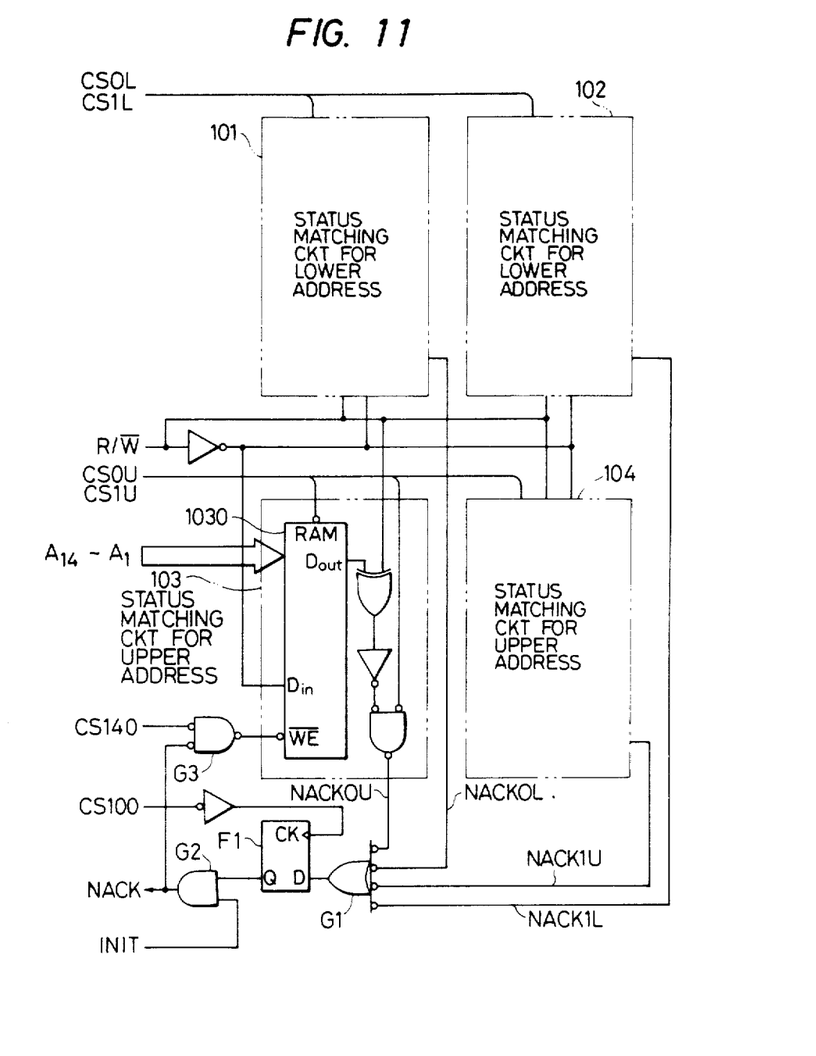
FIG. 11 is a block diagram of a status circuit in FIG. 9.

FIG. 11 is a block diagram of the status circuit in FIG. 9.

The status circuit 10 manages the status information of the respective ports, and decides the propriety of access. Each port is assigned one bit, the value "0" of which indicates the unoccupied status of the port and the value "1" of which indicates the fully occupied status. A signal NACK0L, NACK1L, NACK0U or NACK1U becomes "0" only when the status of the port coincides with the access content and the port access fails. This signal is supplied to a flip-flop F1 through a gate G1. Meanwhile, the signal CS100 delayed by 100 ns is used as the clock signal of the flip-flop F1, to ensure that the signal NACK0L-NACK1U be latched in the flip-flop F1 in the definite state thereof. This output signal NACK is supplied to the output signal distributing circuit 11, and is also supplied to the write enable terminal $\overline{WE}$ of the RAM 1030 through a gate G3. When the port access succeeds, this signal becomes "0", and the signal "0" enters the RAM 1030, so that the status information of the corresponding port is inverted. The signal CS140 is applied to the gate G3 in order to ensure that the above signal be definite. In addition, when data is written into the RAM 1030, an output terminal $D_{out}$ becomes a high impedance, and hence, the flip-flop F1 is used so that the status at the starting of the access can be correctly held. Besides, when the access fails, the signal to be applied to the write enable terminal $\overline{WE}$ becomes "1", so that the RAM 1030 does not fall into the write mode, and the status information of the port does not change. The status circuit 10 is divided into four parts 101–104 enclosed with dotted lines, among which the circuits 101 and 102 check the statuses of the lower addresses, while the circuits 103 and 104 check the statuses of the upper addresses. Excepting the addresses to be applied and the chip select signals CS0L, 1L, 0U and 1U, the four parts are constructed of quite the same circuit arrangement. In the circuit 103, the RAM 1030 is supplied with the chip select signal CS0U from the address decoding circuit 9, with a read/write signal R/$\overline{W}$ and address A14–A1 from the bus, and with the write enable signal $\overline{WE}$ from the NAND circuit G3. In a case where a write request (R/$\overline{W}$=1) is provided when the status information of the port corresponding to the accessed upper address A14–A1 is "1", a gate circuit is not enabled by the output $D_{out}$ of the RAM 1030 and the output R/$\overline{W}$, and the gate G1 is supplied with "0". In a case where a read request (R/$\overline{W}$=0) is provided when the status information is "0", the gate G1 is similarly supplied with "0" on the basis of the output $D_{out}$ of the RAM 1030 and the output R/$\overline{W}$, and the access is blocked.

Figure 12:
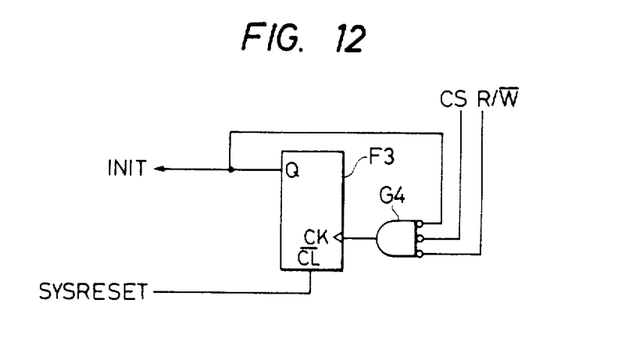
FIG. 12 is an arrangement diagram of an initializing circuit in FIG. 9.

FIG. 12 is a logical structure diagram of the initializing circuit in FIG. 9.

At the closure of a power source, the status information of the ports are still undefined. Here, the output INIT of the flip-flop F3 of the initializing circuit 12 is rendered "0", whereby all the ports are made accessible irrespective of the contents of the status information. More specifically, the signal INIT is applied to the gate G2 of the status circuit 10. Therefore, when the above signal is "0", the output of the gate G2 becomes "0" irrespective of the signals NACK0L–NACK1U, and the ports become accessible. Then, all the ports supported by the data flow controlling module 8 are subjected to read operations by a system initializing program, thereby to bring the ports into the unoccupied statuses. Thereafter, the output signal of a gate G4 is changed from "0" into "1" by a write instruction executed first, and also the output of the flip-flop F3 is changed into "1". As a result, the output of the flip-flop F1 passes through the gate G2 as it is since then, and the propriety of the port access is decided depending upon the status information.

Figure 13:
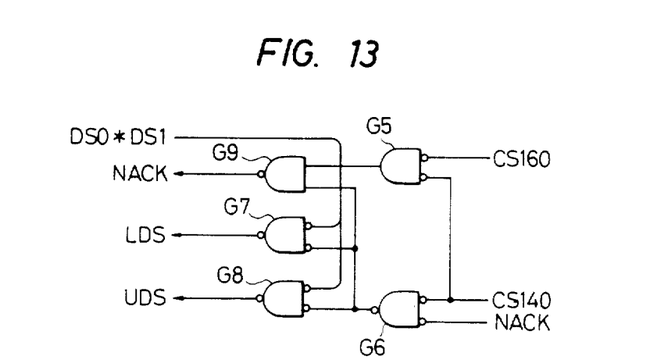
FIG. 13 is a logical structure diagram of an output distributing circuit in FIG. 9.

FIG. 13 is a logical structure diagram of the output signal distributing circuit in FIG. 9.

The output signal distributing circuit 11 generates the signal NACK to be finally sent back to the processing modules 2, 3 and the signals LDS, UDS to be delivered to the common memory 1, on the basis of the output NACK of the gate G2 and the data strobe signal DS0, DS1. The signals CS140 and CS160 applied to the gates G5, G6 serve to ensure the settlement of the signal NACK and to prevent the occurrence of hazards in an access grant cycle.

In performing the present invention, any form may of course be employed as long as it realizes the idea of the ports stated above. For example, when eight RAMs each being of 16 k × 1 bits are used, 128 k ports can be supported. It is also allowed to employ a different kind of RAM device, for example, one of 1 k × 1 bits or 4 k × 1 bits, or a dynamic memory device or the like. However, the memory must be rewritable. The data strobe signals LDS, UDS may well be replaced with one signal or at least three signals. Also the two sorts of signals NACK (LDS, UDS) and the timing signal associated with the rewriting of the status information can take other forms.

Figure 14:
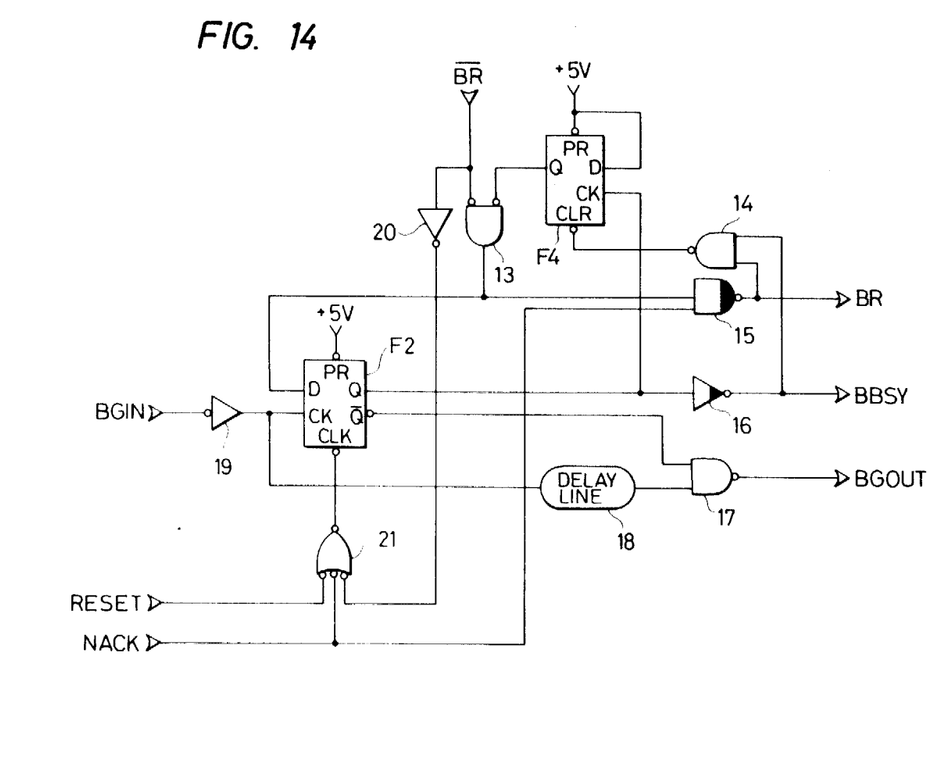
FIG. 14 is a logical structure diagram of a bus control circuit for a processing module illustrative of an embodiment of the present invention.

FIG. 14 is an arrangement diagram of a bus control circuit for the processing module showing an embodiment of the present invention.

In each of the processing modules 2, 3 in FIG. 8, the bus control is performed by the distributed arbiter 26. In a case where the access to a port is not granted, a distributed arbiter in FIG. 14 produces the bus use request signal BR on the basis of the signal NACK provided from the port 7 in FIG. 8, and the same port can be accessed again.

With the conventional bus control circuit, the respective processors can freely provide the bus use request signals BR. In contrast, the bus control circuit shown in FIG. 14 checks the bus use request of the other processor and the status of the bus so as to control the delivery of the bus use request signal. That is, once the processor has used the bus, this processor having used the bus cannot request the use of the bus again until the status is established in which the bus use request signal of the other processor is not provided and in which the bus is not used, in order to give priority to the use of the bus by the other processor providing the bus use request. In this way, the bus masterships of the respective processors are equalized.

The bus control circuit shown in FIG. 14 has a circuit added to the conventional circuit shown in FIG. 4, the added circuit is as follows. The output side signals of the bus drivers 15, 16 for the bus use request signal BR and the bus busy signal BBSY are used as the inputs of a NAND circuit 14, the output of which is used as the clear input of a flip-flop F4. The output Q of the flip-flop F4 controls whether or not the bus request $\overline{BR}$ from the processor can be delivered to the bus as the signal BR.

In the initial condition, the bus control circuit of any distributed arbiter does not produce the bus use request signal BR, and the bus 5 is in the unoccupied status, so that the NAND circuit 14 delivers a low output level to the clear input terminal CLR of the flip-flop F4. Thus, the flip-flop F4 is reset to provide a low level output from the output terminal Q. When, at this time, the processor brings the signal $\overline{BR}$ toward the distributed bus arbiter into its low level with the intention of making the bus use request, a NAND circuit 13 provides a high level output, and the bus use request signal BR can be delivered to the bus. Owing to the delivery of the request signal BR, the bus arbiter 4 is actuated, and the bus use grant signal BGIN is received via the daisy chain. This grant signal BGIN is applied to the clock input terminal CK of a flip-flop F2 through an inverter 19. Then, since high level voltages are applied to the PR input terminal and CLR input terminal of the flip-flop F2 and the clock is valid at that time, a high level voltage and a low level voltage are respectively provided from the output Q and output $\overline{Q}$ of the flip-flop F2. The high level voltage from the output Q delivers the bus busy signal BBSY to the bus via the bus driver 16, and the bus is occupied. Simultaneously, the high level output voltage of the output Q of the flip-flop F2 is applied to the clock input terminal CLK of the flip-flop F4, thereby to apply a high level voltage from the outut Q of the flip-flop F4 to the NAND circuit 13. Thus, the use of the bus is ended. Even when the signal $\overline{BR}$ is brought into its low level again with the intention of making the request for the use of the bus, the inputs of the NAND circuit 13 are not satisfied because of the high level of the output Q of the flip-flop F4, and the bus use request signal BR cannot be delivered onto the bus. In order to deliver the signal BR to the bus, the flip-flop F4 must be reset with its output Q held at the low level. The flip-flop F4 is reset in the status in which the signals BR and BBSY are not on the bus. That is, the bus use requests of the other processors are successively granted by the bus arbiter 4, the use of the bus ends entirely, the signals BR and BBSY become the high level, and the low level voltage is applied from the NAND circuit 14 to the input terminal CLR of the flip-flop F4, whereby the flip-flop F4 is reset. Owing to the resetting of the flip-flop F4, the low level voltage is applied from the output Q to the NAND circuit 13. When the signal $\overline{BR}$ becomes the low level, AND conditions are satisfied, and the output of the NAND circuit 13 becomes the high level. Therefore, it becomes possible to provide the signal BR. Here, when the bus use grant signal BGIN has been received in the status in which the signal BR is not provided, whether or not the signal BR is being provided is decided. When the signal BR is not being provided, the signal BGOUT is delivered in order to apply it as the use grant signal BGIN of the next processor. A delay line 18 affords a delay required for deciding whether or not the signal BR is being provided, and a delay time not shorter than the operating time of the flip-flop F2 is necessary.

In this way, the bus masterships of the respective processors constituting the multiple microprocessor system can be equalized.

As set forth above, according to the present invention, a port is provided as a common memory, so that in transferring data between processors, errors attributed to writing data double into an identical area and reading identical data twice can be detected and prevented, and that the port itself possesses an exclusion control function, whereby the exclusion control having been required in the common connection method is dispensed with, and a common bus occupation time necessary for the exclusion control can be shortened. Further, the respective processors are furnished with bus control circuits, so that the masterships of the respective processors for a common bus can be equalized, and the throughput of the whole system can be enhanced.

We claim:

1. In a multiprocessor system wherein a plurality of processors and a common memory are connected to a common bus; an access control method for a multiprocessor system characterized in that a data transferring port into which data can be written only when said port is unoccupied and from which data can be read only when the data is stored in said port is provided as said common memory, and that in accesing said port from the respective processors, writing data double and reading the same data twice are prevented and also an exclusion control is performed by an operation of said port itself.

2. In a multiprocessor system wherein a plurality of processors and a common memory are connected to a common bus; an access control method for a multiprocessor system characterized in that a data transferring port into which data can be written only when said port is unoccupied and from which data can be read only when the data is stored in said port is provided as said common memory, and that bus control circuits are disposed in the respective processors, so that when two or more of said processors have simultaneously made bus use requests in order to access said port, the processor having once acquired a bus mastership is prevented from making another bus use request by the corresponding bus control circuit until the bus use request(s) from the other processor(s) runs out.

* * * * *